US011873680B2

(12) United States Patent
Satrom et al.

(10) Patent No.: US 11,873,680 B2
(45) Date of Patent: Jan. 16, 2024

(54) HINGED SAFETY GATE

(71) Applicant: PS Industries Incorporated, Grand Forks, ND (US)

(72) Inventors: Daniel Thomas Satrom, Arvilla, ND (US); Chad Joseph Rose, Grand Forks, ND (US); Nathan Joel Ueland, Grand Forks, ND (US)

(73) Assignee: PS INDUSTRIES INCORPORATED, Grand Forks, ND (US)

( * ) Notice: Subject to any disclaimer, the term of this patent is extended or adjusted under 35 U.S.C. 154(b) by 474 days.

(21) Appl. No.: 16/420,518

(22) Filed: May 23, 2019

(65) Prior Publication Data

US 2020/0370370 A1 Nov. 26, 2020

(51) Int. Cl.

| | |
|---|---|
| ***E06B 9/04*** | (2006.01) |
| ***E06B 11/02*** | (2006.01) |
| ***E05F 1/12*** | (2006.01) |
| *E06B 9/00* | (2006.01) |

(52) U.S. Cl.

CPC .............. *E06B 9/04* (2013.01); *E05F 1/1207* (2013.01); *E06B 11/022* (2013.01); *E05Y 2900/40* (2013.01); *E06B 2009/002* (2013.01)

(58) Field of Classification Search

CPC ................. E06B 2009/002; E06B 9/04; E06B 2003/7096; E06B 3/921; E06B 3/92; E05D 7/04

USPC ............................................................... 49/55

See application file for complete search history.

(56) References Cited

U.S. PATENT DOCUMENTS

| | | | |
|---|---|---|---|
| 243,238 | A | 6/1881 | Fouzer |
| 3,389,501 | A | 6/1968 | Arizona |
| 3,866,356 | A | 2/1975 | La Cook et al. |
| 5,921,027 | A | 7/1999 | Siebenahler |
| 5,937,583 | A | 8/1999 | Lamperti |
| 6,094,863 | A | 8/2000 | Lacook, Jr. |
| 6,477,736 | B1 | 11/2002 | Abernathy |
| 6,684,566 | B2 | 2/2004 | Lacook |

(Continued)

FOREIGN PATENT DOCUMENTS

| | | |
|---|---|---|
| DE | 29808910 U1 | 8/1998 |
| EP | 2752542 A1 | 7/2014 |

(Continued)

OTHER PUBLICATIONS

International Patent Application No. PCT/US2020/033609, International Search Report and Written Opinion dated Aug. 11, 2020, 11 pages.

(Continued)

*Primary Examiner* — Gregory J Strimbu

(74) *Attorney, Agent, or Firm* — Fredrikson & Byron, P.A.

(57) ABSTRACT

A hinged safety gate can include a gate frame and a retainer assembly. The gate frame can have a distal upright member, an upper cross-arm, and a lower cross-arm. The hinged safety gate can have a retainer assembly that is configured to be attached to a proximal end of the gate frame and to hingedly couple the gate frame to a stationary vertical surface, permitting the gate frame to swing between an open position and a closed position. The gate frame is horizontally adjustable in two different manners relative to the retainer assembly to accommodate a range of access area widths.

26 Claims, 15 Drawing Sheets

(56) References Cited

U.S. PATENT DOCUMENTS

| | | | | |
|---|---|---|---|---|
| 7,404,532 | B1 * | 7/2008 | Baril | E06B 9/04 248/218.4 |
| 9,032,666 | B2 | 5/2015 | Honeycutt et al. | |
| 9,476,239 | B2 | 10/2016 | Honeycutt et al. | |
| 9,719,299 | B2 | 8/2017 | Honeycutt et al. | |
| 9,926,738 | B1 | 3/2018 | Brown et al. | |
| 10,633,905 | B2 | 4/2020 | Feng | |
| 2003/0230328 | A1 | 12/2003 | Chen | |
| 2005/0120517 | A1 | 6/2005 | Bonham | |
| 2007/0051934 | A1 * | 3/2007 | LaCook | E06B 11/02 256/73 |
| 2007/0113378 | A1 | 5/2007 | Talpe | |
| 2008/0244983 | A1 * | 10/2008 | Peterson | E05D 7/0027 49/381 |
| 2009/0217591 | A1 * | 9/2009 | LaCook | E04G 5/144 49/50 |
| 2010/0319260 | A1 | 12/2010 | Sawa | |
| 2012/0017393 | A1 | 1/2012 | Pate, Jr. | |
| 2013/0086842 | A1 * | 4/2013 | Morrone, III | E06B 9/063 49/55 |
| 2013/0097806 | A1 | 4/2013 | Pate, Jr. | |
| 2013/0219790 | A1 * | 8/2013 | Honeycutt | E06B 3/921 49/176 |
| 2014/0068894 | A1 | 3/2014 | Nagl et al. | |
| 2016/0376824 | A1 | 12/2016 | Talpe | |
| 2017/0122019 | A1 | 5/2017 | Talpe | |
| 2018/0274288 | A1 | 9/2018 | Wang | |
| 2019/0040667 | A1 | 2/2019 | Feng | |
| 2020/0370370 | A1 | 11/2020 | Satrom et al. | |

FOREIGN PATENT DOCUMENTS

| | | | |
|---|---|---|---|
| JP | H08184253 A | | 7/1996 |
| WO | WO 99/61743 | * | 12/1999 |

OTHER PUBLICATIONS

"News / Kee Safety Gates Comply with New EN Standard," dated Jul. 31, 2017, by Kee Safety LLC, accessed on the internet at https://keesafety.ae/news/kee-safety-gates-comply-with-new-en-standard, on Aug. 19, 2019, 4 pgs.

European Patent Application No. 20810807.6, Extended European Search Reported dated Jul. 25, 2022, 10 pages.

Slamproof: "SlamProof Adjustable Speed Gate Closer Installation", Jan. 24, 2018 (Jan. 24, 2018), XP093006619, Retrieved from the Internet: URL:https://www.youtube.com/watch?v=060REoFYrWw.

Ps Industries Inc.: "New EdgeHalt Ladder Safety Gate", May 2, 2022 (May 2, 2022), XP055965139, Retrieved from the Internet: URL:https://www.youtube.com/watch?v=zqawkQnYbzA.

Non-Final Office Action Issued U.S. Patent and Trademark Office for Corresponding Matter U.S. Appl. No. 17/694,337, dated Nov. 15, 2023, p. 34.

* cited by examiner

HINGED SAFETY GATE

TECHNICAL FIELD

This disclosure relates generally to the field of manually operated gates and, more particularly, to devices, systems, and methods for safety gates used in connection with elevated work surfaces.

BACKGROUND

Elevated work surfaces (e.g., mezzanines, platforms, walkways, stair landings, etc.) are used in many settings and present a risk of workers falling and getting injured. This can be especially so in industrial environments. To control access to these elevated work surfaces, safety features in the form of railings and gates satisfying safety standards and regulations are typically used to prevent undesired entry to and exit from the elevated work surface. However, such safety standards and regulations introduce stringent spatial constraints and govern the construction and operation of the gate.

SUMMARY

An illustrative hinged safety gate allows multidimensional adjustments to safely cover spatially constrained access areas to elevated work surfaces while controlling access to the platforms and satisfying safety requirements. These safety requirements can be in the form of standards, codes, or regulations and may impose spatial constraints on the access area. The elevated work surface access area can be defined by an elevated work surface platform, and two opposing stationary surfaces (e.g., opposing stanchions of guard-rails). The stationary surfaces can be positioned an access width apart from one another. Access onto and from the elevated work surface can be controlled via the hinged safety gate.

The hinged safety gate can include a gate frame configured to control access through an elevated work surface access area. The gate frame can have a distal upright member, an upper cross-arm, and a lower cross-arm. The upper cross-arm can have an upper cross-arm height, and the lower cross-arm can have a lower cross-arm height. A vertical spacing can extend between an upper edge of the lower cross-arm and a lower edge of the upper cross-arm. The upper cross-arm height, the lower cross-arm height, and the vertical spacing can enable the gate frame to satisfy a platform-to-lower-edge safety requirement, a spacing-between-cross-arms safety requirement, and an overall height safety requirement.

The gate frame may be coupled to a stationary surface via a retainer assembly included in the hinged safety gate. The retainer assembly can be configured to be attached to a proximal end of the gate frame. The retainer assembly can be configured to hingedly couple the gate frame to the stationary surface to permit the gate frame to swing between an open position and a closed position in which the distal upright member can be positioned proximate to the stanchion.

Such a hinged safety gate can provide a variety of advantages over conventional safety gates for controlling access to an elevated work surface. Components of the gate frame may satisfy requirements imposed by safety standards and regulations without the need for more than two cross-arms or other additional rails, members, or features. For example, the geometry of either or both of the upper cross-arm and the lower cross-arm can be oversized such that their vertical dimensions reduce spacing between the upper cross-arm and the lower cross-arm, the lower cross-arm and the platform, or both. In some embodiments, the construction of the hinged safety gate can allow for dual horizontal adjustment of the hinged safety gate—the gate frame being horizontally adjustable relative to the retainer assembly, and the gate frame being extendable through multiple horizontal positions.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives. A number of various exemplary hinged safety gate devices and associated methods that can be used in connection with elevated work surfaces are disclosed herein using the description provided as follows in addition to the accompanying drawings. Each of the embodiments disclosed herein can be employed independently or in combination with one or more (e.g., all) of the other embodiments disclosed herein.

Figure 1:
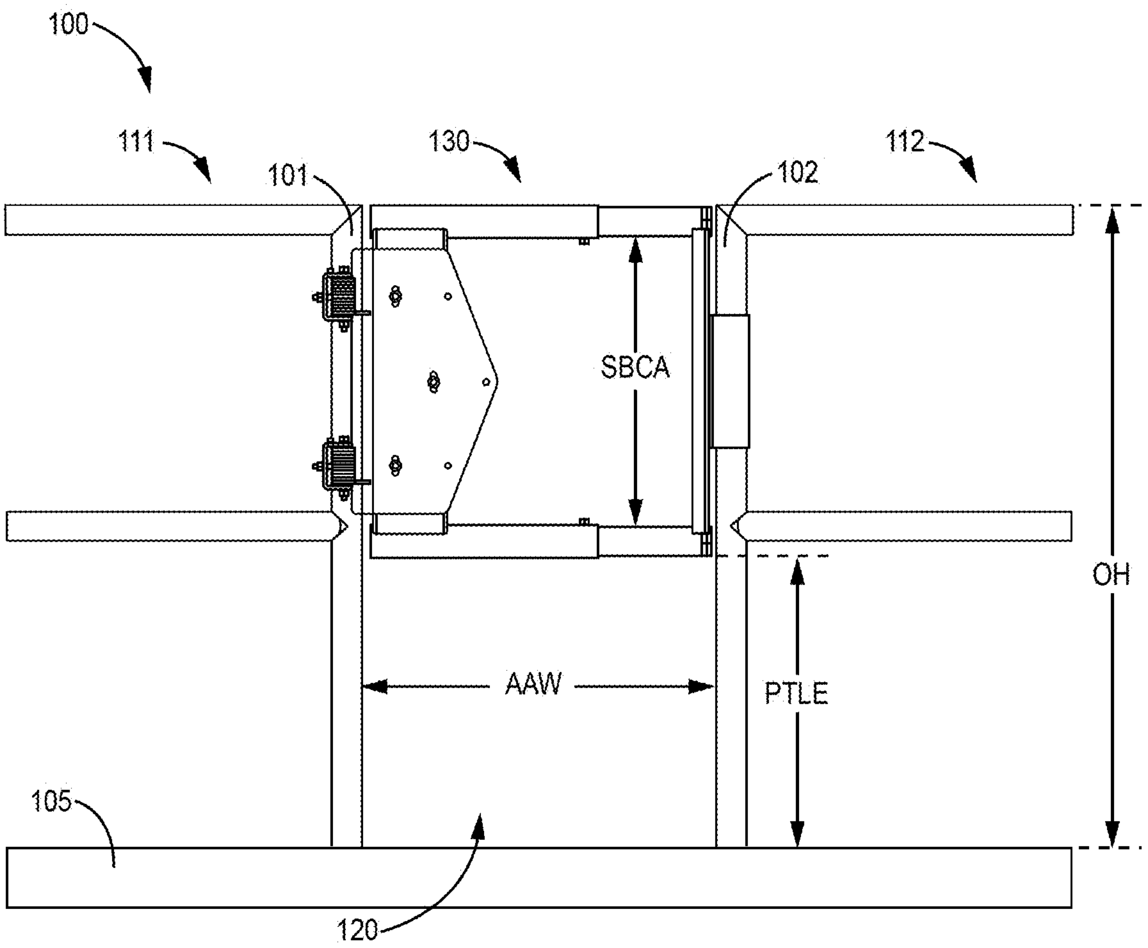
FIG. 1 is a schematic view of a hinged safety gate installed between two guard-rails, which are fixedly attached to a platform.

To ensure operator safety, industry standards and regulations govern many aspects of an elevated work surface 100 including an access area 120 of the elevated work surface 100 and gates 130 designed to control access through the access area 120 as shown in FIG. 1. An elevated work surface 100, for instance, may be employed in an industrial work area for elevated storage. In some instances, the access area 120 may be defined by a platform 105, and first and second stationary surfaces (e.g., stationary vertical surfaces). As discussed in greater detail elsewhere herein, each stationary surface can be a stanchion, an angle railing, a wall, or the like.

As shown, the elevated work surface 100 can include first and second stanchions 101, 102 in respective first and second guard-rails 111, 112. The first stanchion 101 may oppose the second stanchion 102. The first and second guard-rails 111, 112 may be anchored about the periphery of the platform 105 of the elevated work surface 100. Though relatively small in some installations, the access area 120 can be defined by the space between the platform 105 and the first and second stanchions 101, 102 and is generally wide enough to allow an operator and/or materials to move freely into and out of it.

The access area 120 may be defined by one or more access dimensions. For example, the first stationary vertical surface and the stanchion may be positioned an access width apart from one another. An upper edge of the guard-rail may be positioned an overall height above the platform 105 of the elevated work surface 100.

Industry standards and regulations often dictate that a gate 130 designed to fit in an access area 120 of an elevated work surface 100 meets specific dimensional requirements. For example, there may be an access-area-width requirement (shown in FIG. 1 as AAW) related to the distance between vertical members of an access area 120. In another example, there may be an overall height safety requirement (shown in FIG. 1 as OH) of one or more guard-rails 111, 112 and the upper edge of the gate 130. In some instances, the overall height safety requirement may be at least 1100 mm. In another example, there may be a spacing-between-cross-arms safety requirement (shown in FIG. 1 as SBCA) related to the vertical spacing between any two rails of the gate 130. In some instances the spacing-between-cross-arms safety requirement may require that vertical spacing to not exceed 500 mm. In another example, there may be a platform-to-lower-edge safety requirement (shown in FIG. 1 as PTLE) related to the vertical distance between the platform 105 and the lower edge of the gate 130. In some instances, the platform-to-lower-edge safety requirement may require that vertical distance to not exceed 500 mm.

Figure 2:
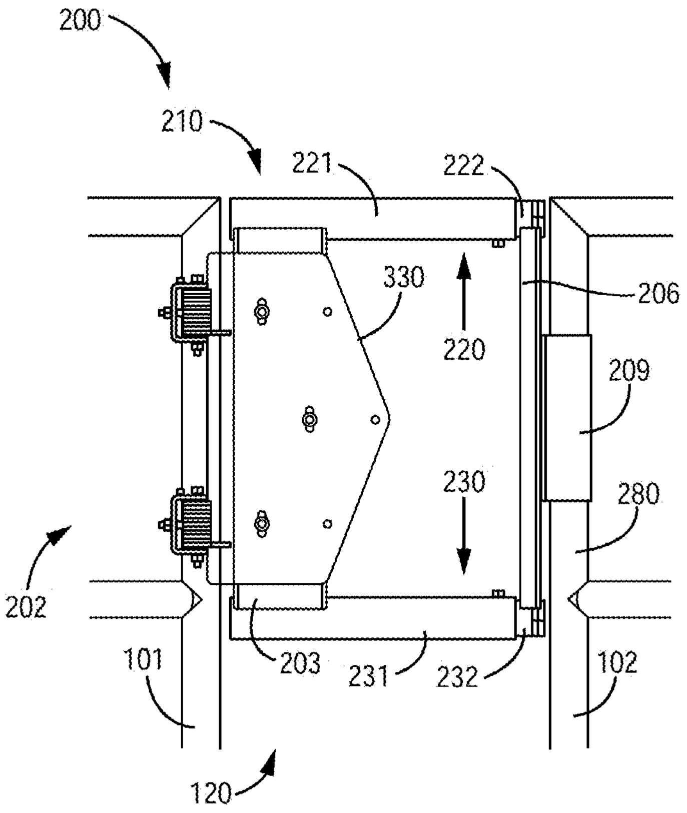
FIG. 2 is a front elevational view of a hinged safety gate in an unextended position installed between two guard-rails.

An illustrative hinged safety gate 200 as shown in FIG. 2 can be configured to control access onto and out of the platform while satisfying safety requirements of the access area 120. The hinged safety gate 200 can include a gate frame 210 and a retainer assembly 202. For use, the hinged safety gate 200 can be mounted to the first stationary vertical surface (e.g., a stanchion such as the first stanchion 101 or the second stanchion 102) and adjustably fitted within the access area 120 of an elevated work surface. In many instances, as described further elsewhere herein, the hinged safety gate 200 is adjustable in multiple dimensions to fit within the access area 120. Such adjustments may be made before, during, or after installation. During use of the hinged safety gate 200, access to the elevated work surface can be allowed or prevented while eliminating any pinch points.

Figure 3A:
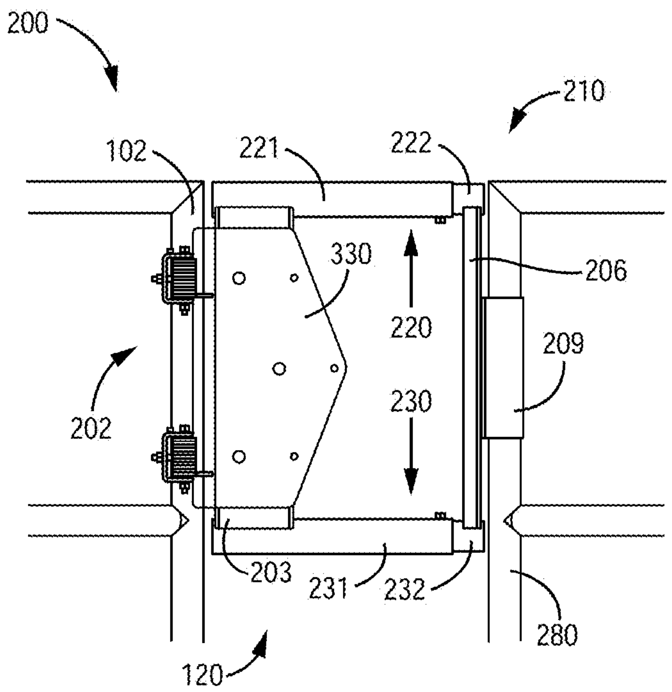
FIG. 3A is a front elevational view of a hinged safety gate in an unextended position installed between two guard-rails and mounted in a proximal hole pattern of a retainer plate.
Figure 3B:
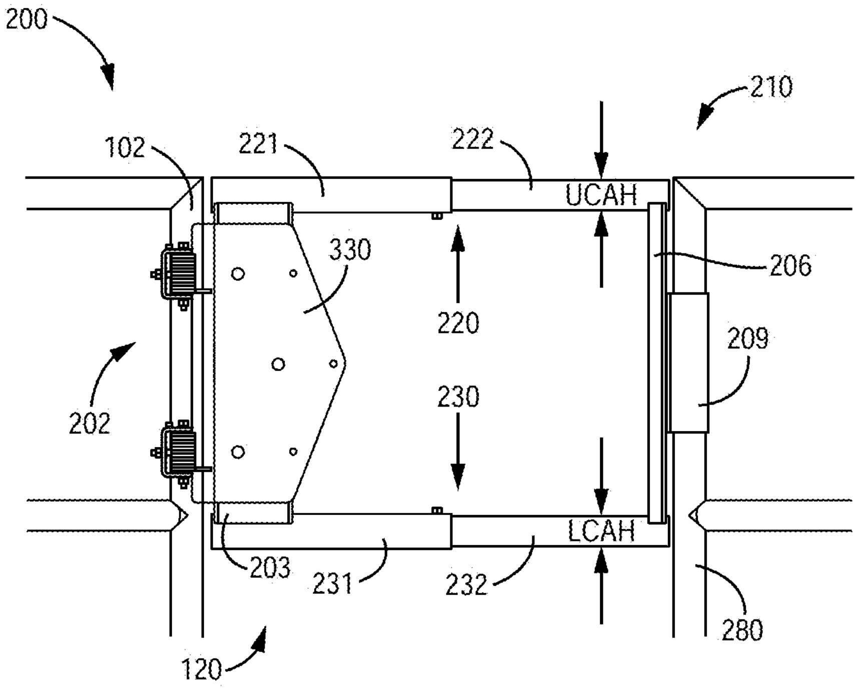
FIG. 3B is a front elevational view of a hinged safety gate in an extended position installed between two guard-rails and mounted in a proximal hole pattern of a retainer plate.
Figure 3C:
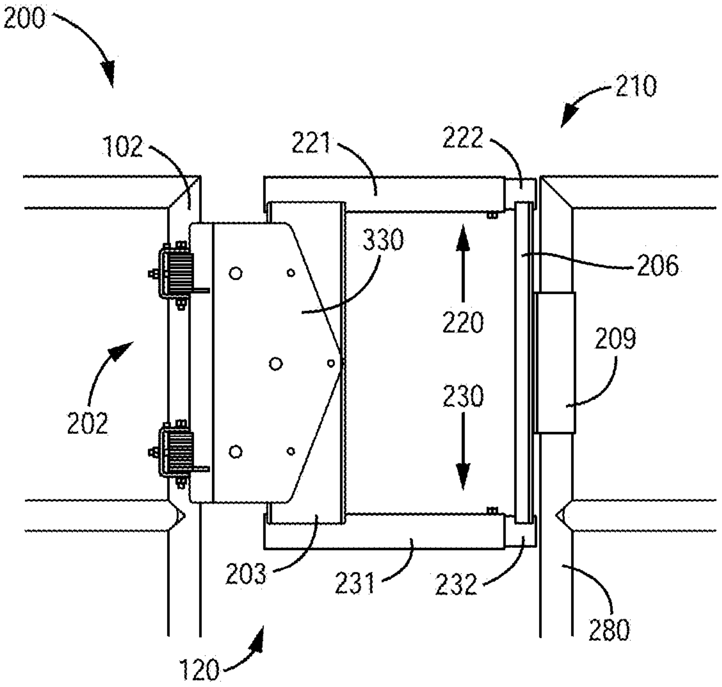
FIG. 3C is a front elevational view of a hinged safety gate in an unextended position installed between two guard-rails and mounted in a distal hole pattern of a retainer plate.
Figure 3D:
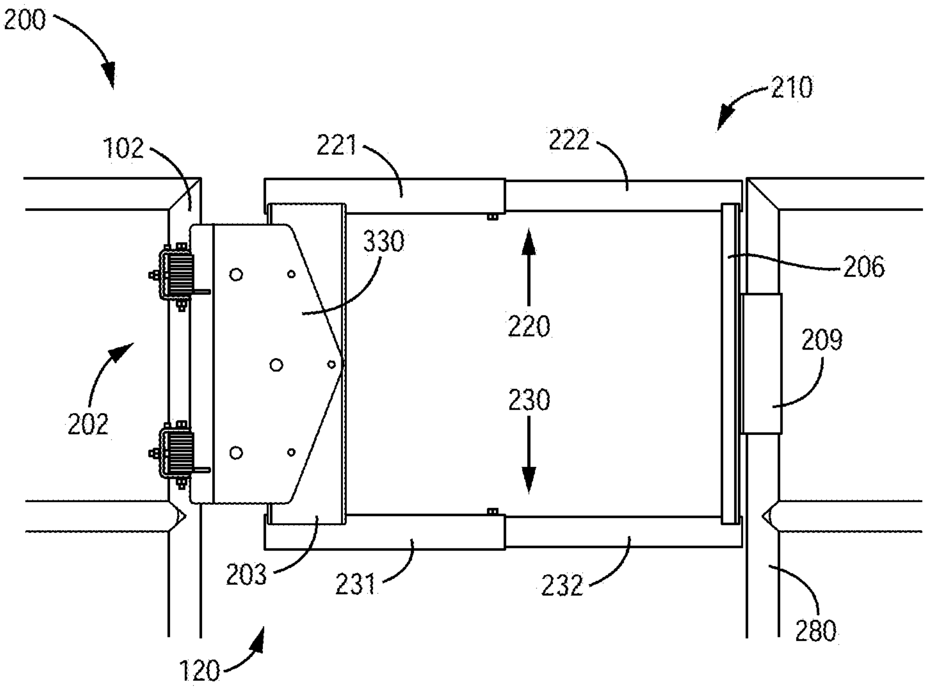
FIG. 3D is a front elevational view of a hinged safety gate in an extended position installed between two guard-rails and mounted in a distal hole pattern of a retainer plate.

Construction of the gate frame 210 can allow the hinged safety gate 200 to be movable between an unextended position, as shown in FIGS. 3A and 3C, and an extended position, as shown in FIGS. 3B and 3D. The gate frame 210 can include an upper cross-arm 220, a lower cross-arm 230, and a distal upright member 206. In some embodiments, the gate frame 210 can include a gate stop 209. In some embodiments, the gate frame 210 can include a proximal upright member 203. The gate frame 210 can have a relatively rectangular shape with one or more rails, e.g., the lower cross-arm 230, the upper cross-arm 220, or a separate arm. In some embodiments, the upper cross-arm and the lower cross-arm may be the only two cross-arms of the gate frame. In some embodiments, the proximal upright member and the distal upright member may be the only two upright members of the gate frame. To secure the gate frame 210 to the retainer assembly 202, the proximal upright member 203 can include mounting holes or slots, e.g., to receive fasteners that extend through a retainer plate 330, as discussed elsewhere herein. In some embodiments, the distal upright member 206 can include the gate stop 209, which can be positioned by adjusting the gate frame 210 to mate the gate stop 209 with a stopping surface 280. The gate stop 209 can include a gate stop pad (see reference 701 in FIG. 7) to prevent damage to the stopping surface 280. Hinged safety gate embodiments that employ a hinge stop configuration may not include a gate stop 209. Spacing between components of the gate frame 210 and mating components of the hinged safety gate 200 may be sufficient so as to eliminate any pinch points. In some embodiments, the upper cross-arm and the lower cross-arm may each be made of metal (e.g., for ease of construction, for enhanced durability, etc.). In some such embodiments, the proximal upright member and/or the distal upright member may also be made of metal. In some embodiments, the distal upright member may be positioned proximally of the distal ends of the cross-arms such that the cross-arms extend distally beyond the cross-arms by a small amount.

Dimensions of the gate frame 210 can enable the hinged safety gate 200 to satisfy safety requirements for the access area 120 and the gate. Some embodiments satisfy the safety requirements with the gate frame 210 having only two upright members and/or two cross-arm members. In one example, an upper cross-arm height and a lower cross-arm height can enable the gate frame 210 to satisfy the platform-to-lower-edge safety requirement and the overall height safety requirement. The vertical spacing extending between the upper edge of the lower cross-arm 230 and the lower edge of the upper cross-arm 220 may enable the gate frame 210 to satisfy the spacing-between-cross-arms safety requirement. In any of these instances, one or more dimensions of the hinged safety gate 200 may satisfy these safety requirements.

In some embodiments, the components of the gate frame 210 may have a relatively large outer profile. For instance, the height of the upper cross-arm 220 (shown as UCAH in FIG. 3B) and/or the height of the lower cross-arm 230 (shown as LCAH in FIG. 3B) may be oversized (e.g., at least 5 cm). Such oversized components can allow the hinged safety gate 200 to satisfy safety requirements, such as maintaining the height between the lower edge of the gate frame 210 and the platform as discussed elsewhere herein, without having to make positional adjustments. Plus, the need to add components to the hinged safety gate 200, such as another rail, screen, fill, or vertical members, to reduce clearance through the rails of the hinged safety gate 200 can be avoided.

As noted, dimensions of the upper cross-arm 220 and the lower cross-arm 230 may enable the hinged safety gate 200 to satisfy a number of safety requirements. For example, increasing the height of the lower cross-arm 230 and the upper cross-arm 220 can reduce the distance between the lower edge of the upper cross-arm 220 and the upper edge of the lower cross-arm 230, thereby satisfying the spacing-between-cross-arms safety requirement of not to exceed 500 mm between any two rails. Likewise, increasing the height of the lower cross-arm 230 can reduce the distance between the lower edge of the lower cross-arm 230 and the platform, thereby satisfying the platform-to-lower-edge safety requirement of not to exceed 500 mm for the lower edge of the hinged safety gate 200. In some instances, if a distance between the platform and the upper edge of the upper cross-arm 220 is 1100 mm, and a distance between the platform and the lower edge of the lower cross-arm 230 is 500 mm, and a distance between the lower edge of the upper cross-arm 220 and the upper edge of the lower cross-arm 230 is 500 mm, the combined height of the upper cross-arm 220 and the lower cross-arm 230 can be 100 mm. In some instances, each of the upper cross-arm height and the lower cross-arm height is at least 50 mm. The height of the upper cross-arm 220 and the lower cross-arm 230 can be larger if the distance between the platform and the upper edge of the upper cross-arm 220 is greater. In some embodiments, components of the hinged safety gate 200, including the gate frame 210, can be adjusted to satisfy safety requirements and spatial constraints. In some embodiments, such gate frames may include only two upright members and/or only two cross-arms. According to some regulations, the hinged safety gate must be arranged and sized so as not to allow a sphere of a certain diameter (e.g., 48 cm) to pass through the guard-rail.

In wider access areas 120, the gate frame 210 can be adjusted to modify its length and, thus, span over the access area 120 as shown in FIGS. 3A-3D. The upper cross-arm 220 can include an upper cross-arm main portion 221 and an upper cross-arm extension 222, and the lower cross-arm 230 can include a lower cross-arm main portion 231 and a lower cross-arm extension 232. In some instances, the upper cross-arm extension 222 and the lower cross-arm extension 232 are designed to fit within the upper cross-arm main portion 221 and the lower cross-arm main portion 231 respectively. In some instances, the upper cross-arm main portion 221 and the lower cross-arm main portion 231 are designed to fit within the upper cross-arm extension 222 and the lower cross-arm extension 232 respectively. The main portions and the extensions can be configured to slide telescopingly relative to one another. In some embodiments, the main portions and extensions can each be hollow and can have a cross section that is circular, square, or other suitable shape. In some embodiments, a channel may be formed in either a main portion or an extension, and a tab may be formed in the other of the main portion and the extension, with the tab sliding within the channel as the main portion and the extension move relative to one another.

The hinged safety gate 200 can be movable between the unextended position shown in FIG. 3A or 3C to the extended position shown in FIG. 3B or 3D. An illustrative gate frame 210 can have the upper cross-arm main portion 221 and the lower cross-arm main portion 231 stationary to the proximal upright member 203 and have the upper cross-arm extension 222 and the lower cross-arm extension 232 stationary to the distal upright member 206. Thus, as the distal upright member 206 moves toward or away from the proximal upright member 203, both the upper cross-arm main portion 221 and the upper cross-arm extension 222 and the lower cross-arm main portion 231 and the lower cross-arm extension 232 can move relative to each other (e.g., in a telescoping fashion). As a result, the length of the gate frame 210 can be adjusted to be shorter or longer to span access areas 120 of various widths, e.g., such that the gate stop 209 mates with the stopping surface 280. In some instances, the gate frame 210 can be adjustable such that the hinged safety gate extends between about 380 mm and about 915 mm or more. In some embodiments, when the hinged safety gate 200 is in an unextended position, the distal ends of the upper cross-arm extension 222 and the lower cross-arm extension 232 are positioned near to the respective distal ends of the upper cross-arm main portion 221 and the lower cross-arm main portion 231, such as in FIGS. 3A, 3C, and 5A-5C.

Figure 4:
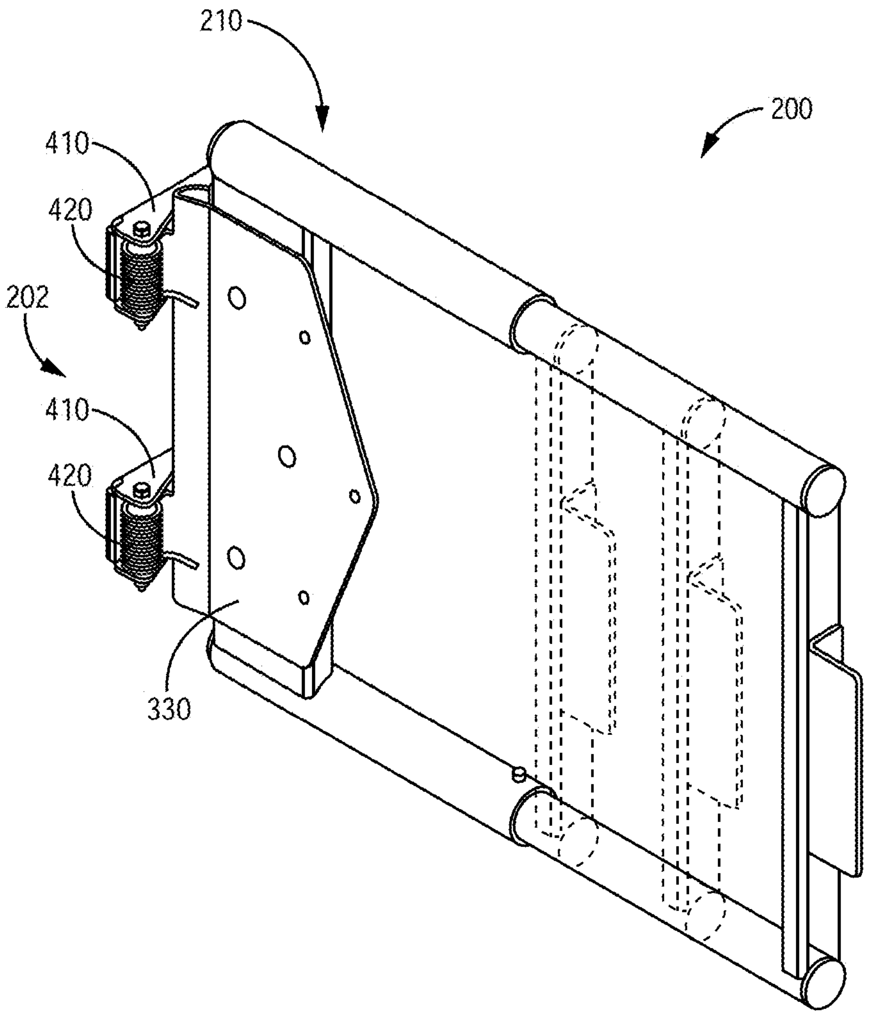
FIG. 4 is a perspective view of a hinged safety gate extended over various positions indicated by the shadows mounted in a proximal hole pattern of a retainer plate.

Most embodiments of the hinged safety gate 200, for instance, will be installed such that the retainer assembly 202 mounts to the first stationary vertical surface. As shown in FIG. 4, the retainer assembly 202 can include one or more hinged brackets 410, one or more spring assemblies 420, and a retainer plate 330. In some embodiments, the retainer plate 330 may be composed of multiple components (e.g., one lower component and one upper component). It should be noted that, though discussed and depicted in the figures as having a certain number of these components, it is understood that any number of combinations of these components may be employed without departing from the scope of the present disclosure. The retainer assembly 202 may then be used to secure the hinged safety gate 200 to the first stationary vertical surface at a desired location.

Figure 5A:
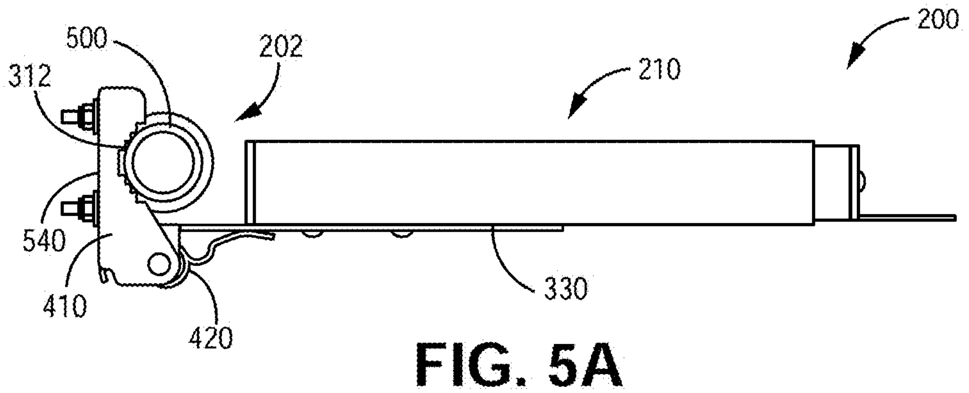
FIG. 5A is a top elevational view of a hinged safety gate in an unextended position with the hinged bracket installed on a round guard-rail.
Figure 5B:
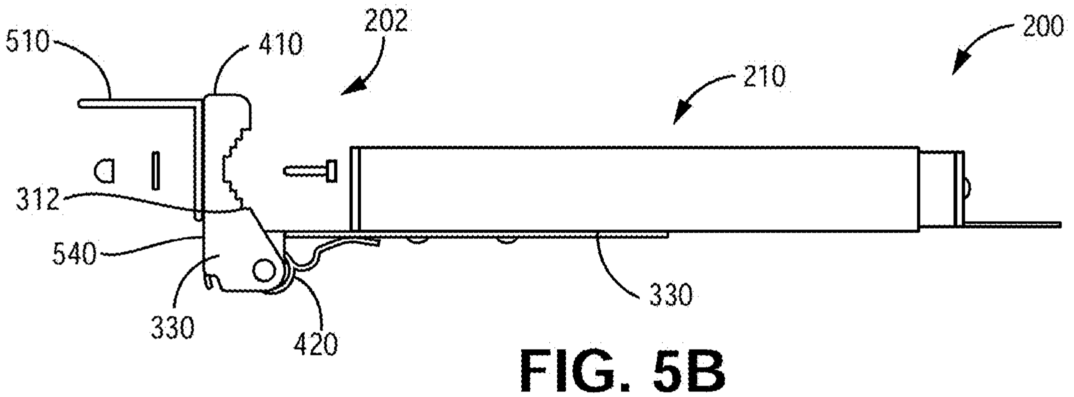
FIG. 5B is a top elevational view of a hinged safety gate in an unextended position with the hinged bracket installed on an angle railing.
Figure 5C:
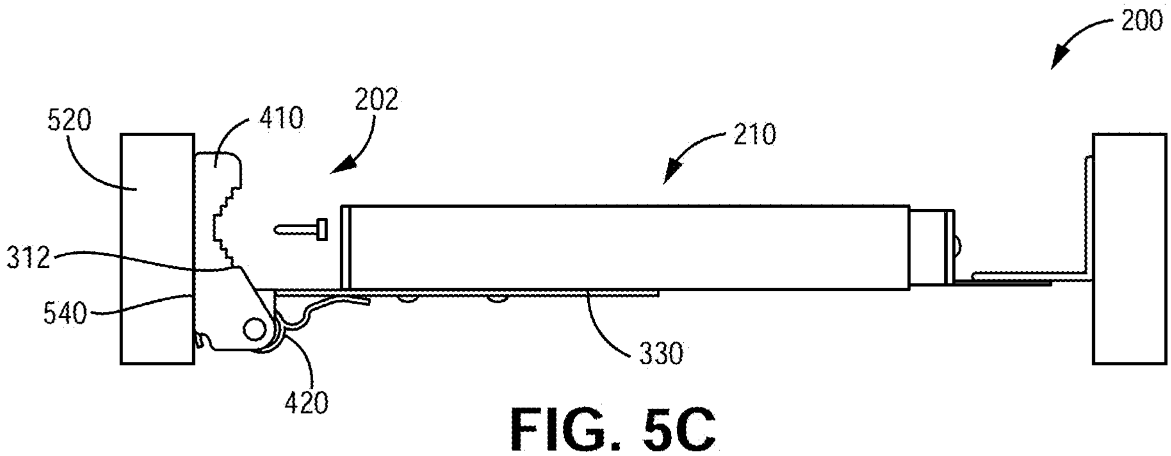
FIG. 5C is a top elevational view of a hinged safety gate in an unextended position with the hinged bracket installed on a flat wall surface.

Once an installation position is selected, the hinged bracket 410 can be fixedly attached to the first stationary vertical surface as shown in FIGS. 5A-5C. Stationary vertical surfaces can include stanchions 500, angle railings 510, walls 520, or the like. The hinged bracket 410 can be attached to the first stationary vertical surface via one or more fasteners (e.g., any combination of U bolts, anchors, bolts, nuts, etc.). To accommodate unique stationary vertical surfaces (e.g., of stanchions 500), the hinged bracket 410 can include one or more toothed sections 312 for a universal fit around round or square tubes.

The retainer assembly 202 may be configured to be attached to the gate frame 210 to secure the gate frame 210 to the first stationary vertical surface. For instance, the retainer assembly 202 may be configured to hingedly couple the gate frame 210 to the first stationary vertical surface and configured to be attached to the proximal upright member 203 of the gate frame 210. A spring assembly 420 can be coupled between the hinged bracket 410 and the retainer plate 330 and can thereby allow the retainer assembly 202 to secure the gate frame 210 to the first stationary vertical surface. While securing the gate frame 210, the retainer assembly 202 may allow multidimensional adjustment of the hinged safety gate 200, e.g., the gate frame 210 relative to the retainer assembly 202.

Some gate frame embodiments include an upper cross-arm, a lower cross-arm, and a distal upright member but do not include a proximal upright member. In some such embodiments, a proximal end of the gate frame (e.g., proximal ends of the upper cross-arm and the lower cross-arm) may be attached to the retainer assembly. The attachment of the gate frame proximal end to the retainer assembly may be adjustable, permitting horizontal and/or vertical adjustment of the gate frame relative to the retainer assembly.

Once the hinged safety gate 200 is installed, the spring assembly 420 can be configured to permit swinging of the hinged safety gate 200. The spring assembly 420 can comprise one or more torsional biasing members (e.g., a torsional spring or the like).

In many instances, the spring assembly 420 can be configured to fit within the profile of the hinged bracket 410. For example, the spring assembly 420 can be positioned such that no coils of the torsional biasing member extend beyond a bottom surface 540 of the hinged bracket 410. In such instances, the hinged bracket 410 can be mounted to a flat stationary vertical surface (e.g., the angle railings 510 and the wall 520) without having to add shims between the bottom surface 540 and the stationary vertical surface (e.g., the angle railings 510 and the wall 520) to provide clearance for the spring assembly 420 during swinging. The spring assembly 420 can be configured to swing the hinged safety gate 200 between an open position and a closed position as discussed elsewhere herein.

Figure 6:
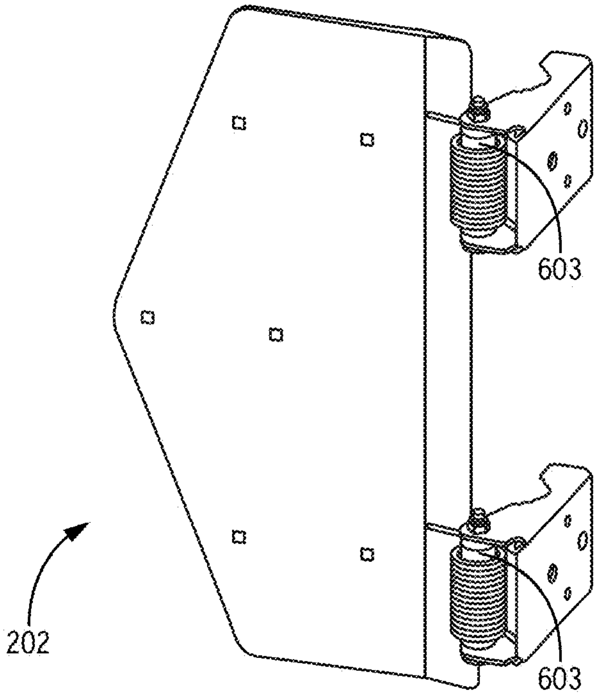
FIG. 6 is a perspective view of an illustrative retainer assembly.

Deformation of the torsional biasing members from use and undesired contact with metal from other components can be prevented via corresponding bushings 603 fitted within each of the torsional biasing members as shown in FIG. 6. In many instances, the bushings 603 can be cylindrical (e.g., an annular cylindrical bushing 603). Each bushing 603 can isolate a torsional biasing member from contacting other metal surfaces such as the hinge pivot bolt. The bushings 603 can allow torsion springs with a coil diameter much larger than the hinge pivot bolt to be oriented more concentrically about the hinge pivot bolt because the bushing 603 fills the space between the torsion springs and the hinge pivot bolt. In some embodiments, the bushing 603 may be configured to retain the shape of a spring in the spring assembly 420 and inhibit contact between the spring and portions of the hinged safety gate 200.

Figure 7:
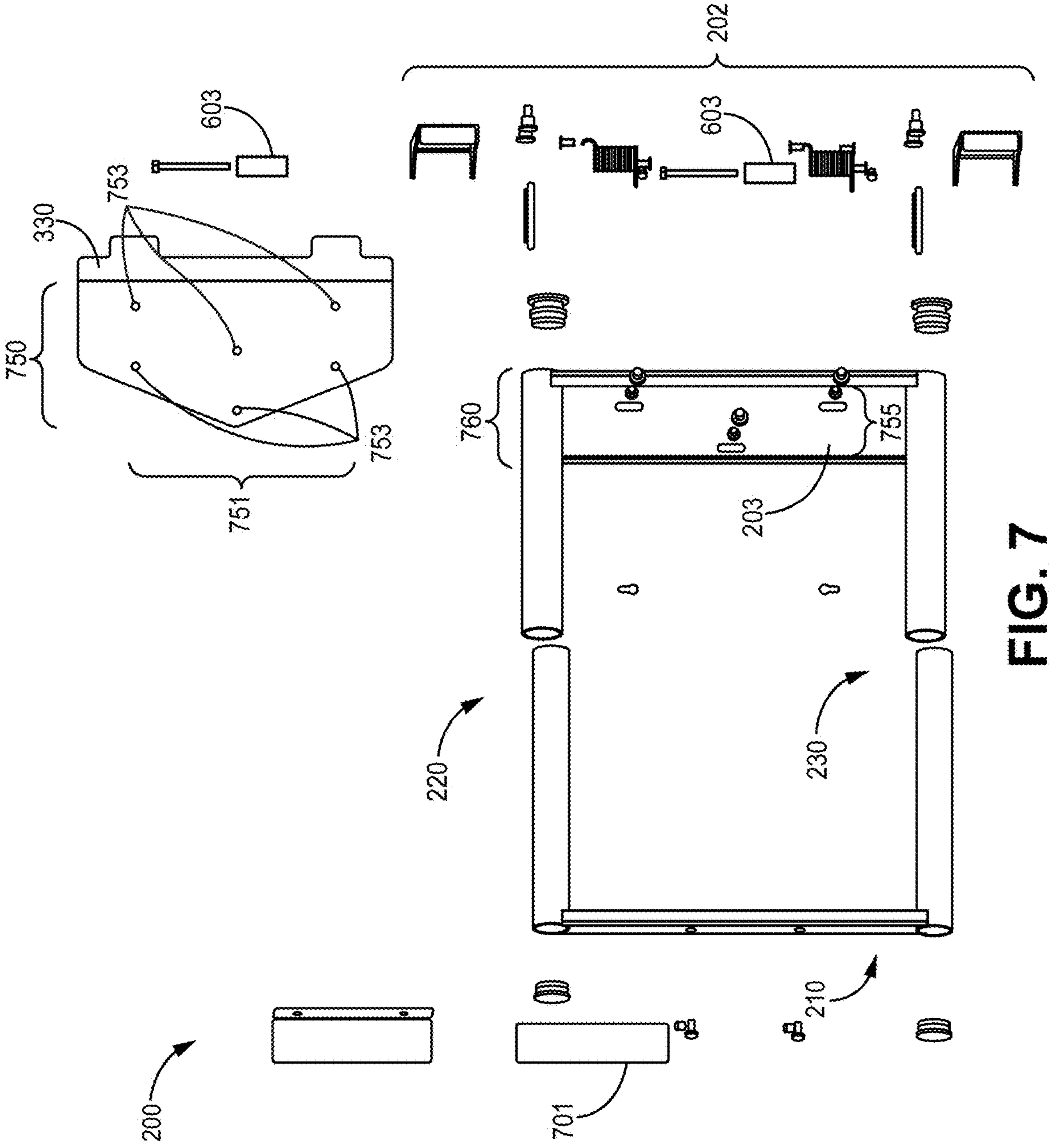
FIG. 7 is an exploded view of an illustrative hinged safety gate.

Without having to uninstall and reinstall the hinged safety gate 200, adjustments can be made to the hinged safety gate 200 in the horizontal and vertical directions to fit within an access area. For instance, as shown in FIG. 7, components of the hinged safety gate 200 can include an adjustment region 750 that allows relative adjustment of components of the hinged safety gate 200. Adjustments may be locked into position as the retainer plate 330 is secured to the gate frame 210, e.g., via one or more fasteners. The adjustment of components of the hinged safety gate 200, including the gate frame 210, may be facilitated via corresponding adjustment regions 760 in the retainer plate 330 and the gate frame 210. Though discussed in relation to the vertical and horizontal directions, it is understood that the hinged safety gate 200 can be adapted to be adjustable in other directions (e.g., diagonally, depth-wise, etc.) using similar techniques as disclosed herein.

Without having to uninstall the retainer assembly 202, the gate frame 210 may be adjusted relative to the retainer assembly 202 via the adjustment region 750 to fit within the access area. Construction of the adjustment region 750 and the corresponding adjustment region 760 may vary across different components of the hinged safety gate 200. For example, each adjustment region 750 can include one or more hole mounting patterns such as a combination of elongated holes and fitted holes, offset hole patterns, or both to allow for a wide range of adjustments. The retainer plate 330 may include a retainer adjustment region 751 that corresponds to a frame adjustment region 755 of the gate frame 210, e.g., in the proximal upright member 203.

Though discussed and depicted in certain locations and in certain components, one skilled in the art will appreciate that the adjustment regions 750 may vary along those lines without departing from the scope of the present disclosure. For example, in various embodiments, either the frame adjustment region 755 or the retainer adjustment region 751 may include a set of fitted mounting holes and the other may include a set of elongated mounting holes. Some such embodiments of the hinged safety gate 200 may have the retainer adjustment region 751 include multiple sets of fitted mounting holes 753 that are horizontally offset from one another. In some embodiments, either the frame adjustment region 755 or the retainer adjustment region 751 can include one or more horizontally elongated slots to permit horizontal adjustment of the gate frame 210 relative to the retainer assembly 202 to an infinite number of positions between the slot ends.

Figure 8A:
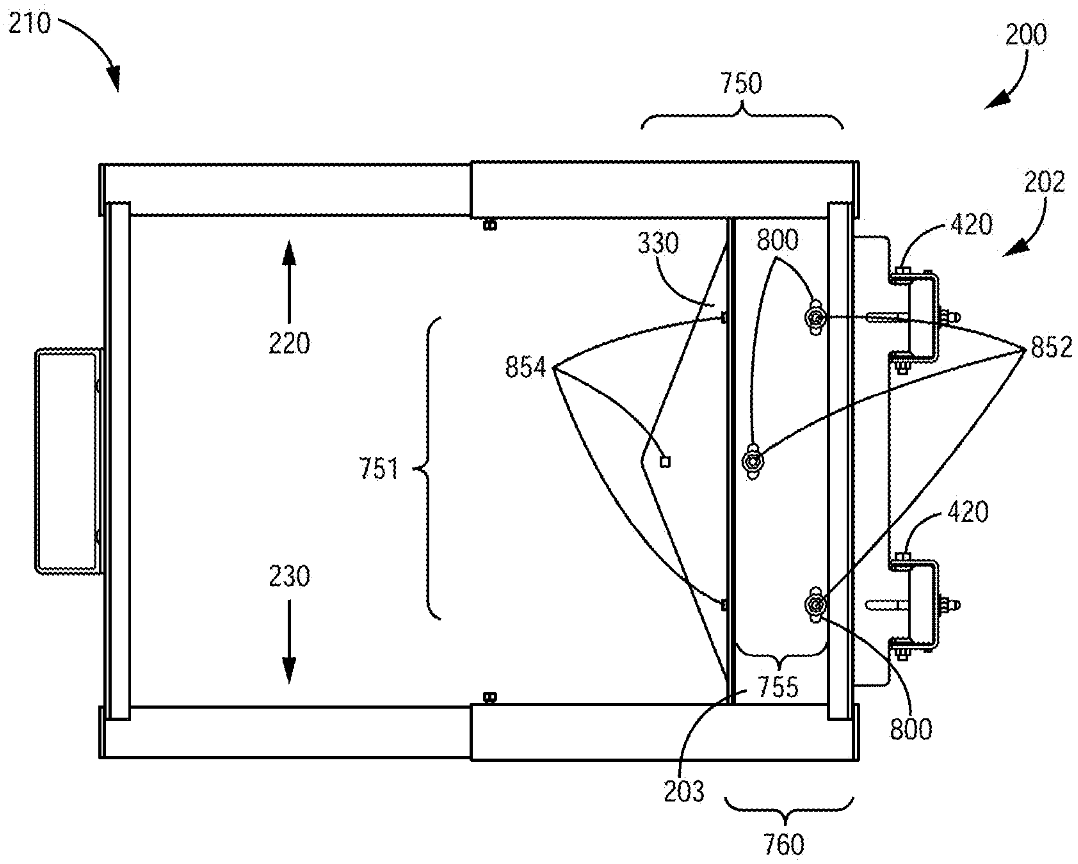
FIG. 8A is a rear elevational view of a hinged safety gate having a retainer plate with a proximal hole pattern and a distal hole pattern.
Figure 8B:
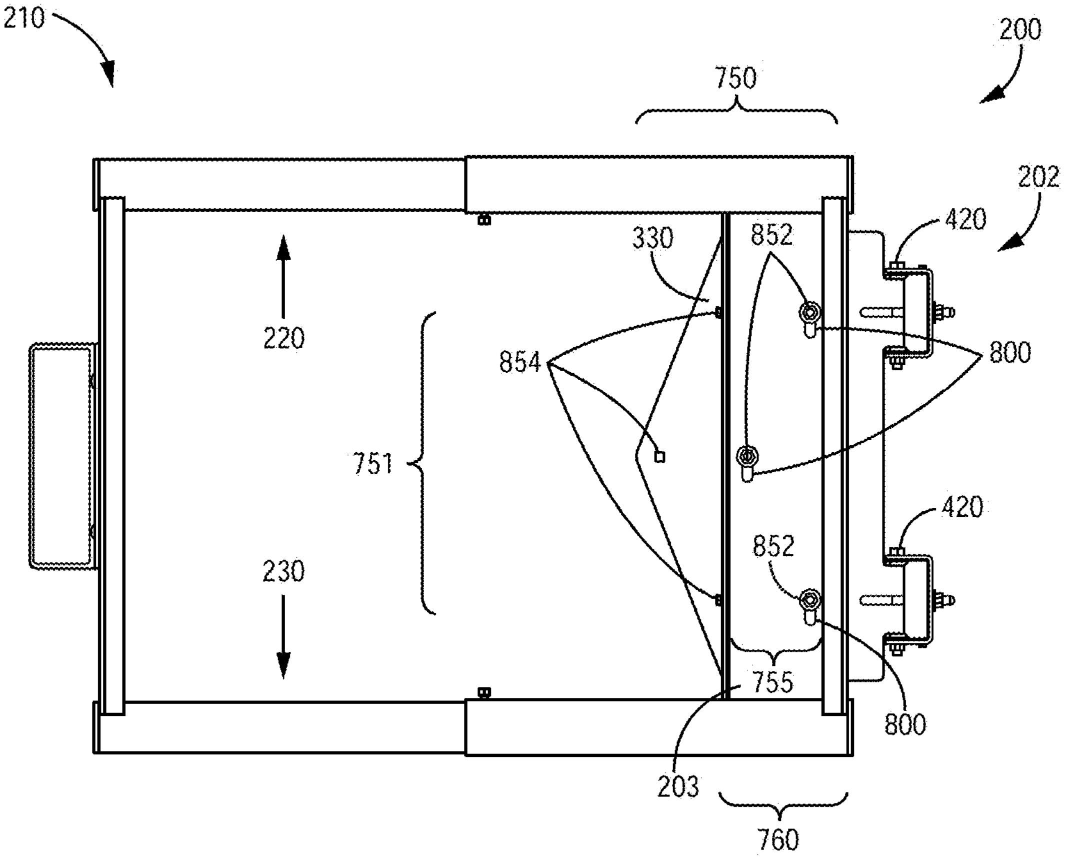
FIG. 8B is a rear elevational view of a hinged safety gate having a retainer plate with a proximal hole pattern and a distal hole pattern and with a gate frame mounted to a retainer plate in a lower adjusted position.
Figure 8C:
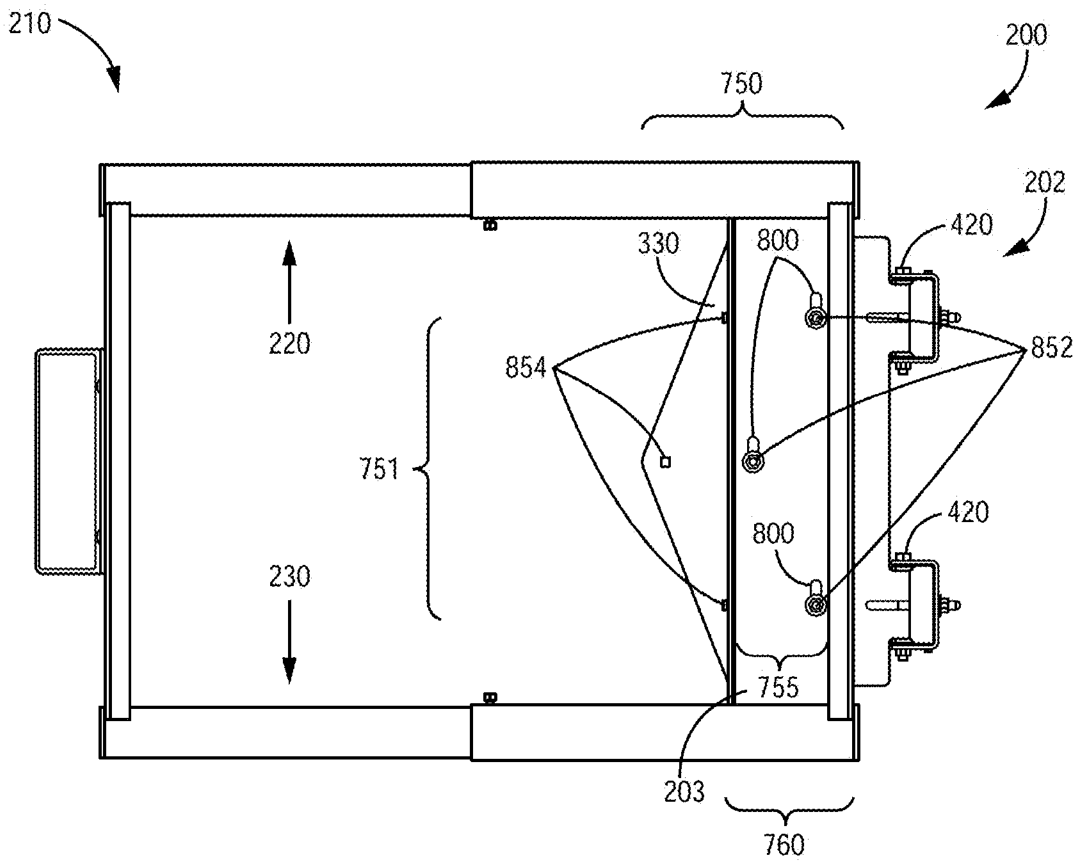
FIG. 8C is a rear elevational view of a hinged safety gate having a retainer plate with a proximal hole pattern and a distal hole pattern and with a gate frame mounted to a retainer plate in an upper adjusted position.

Referring to FIGS. 8A-8C, using the retainer adjustment region 751 and the frame adjustment region 755, the gate frame 210 may be adjusted relative to the retainer assembly 202. The retainer plate 330 can maintain the gate frame 210 in any position such that the upper cross-arm 220 and the lower cross-arm 230 are generally parallel with the platform. In an illustrative embodiment, for horizontal adjustments, the retainer adjustment region 751 can include a proximal hole pattern 852 that is proximal to the spring assembly 420 and a distal hole pattern 854 that is distally offset from the proximal hole pattern 852. Both the proximal hole pattern 852 and the distal hole pattern 854 can comprise fitted holes that correspond with a pattern of elongated holes 800, e.g., elongated in the vertical direction, in the gate frame 210.

Horizontal adjustment of the hinged safety gate 200 may include mounting the gate frame 210 to either the proximal hole pattern, as seen in FIGS. 3A and 3C, or the distal hole pattern, as seen in FIGS. 3B and 3D. For example, to increase the width of the hinged safety gate 200, the gate frame 210 can be mounted to the distal hole pattern instead of the proximal hole pattern. To decrease the width of the hinged safety gate 200, the gate frame 210 can be mounted to the proximal hole pattern instead of the distal hole pattern. In some instances, for narrower access areas 120 (e.g., about 380 mm to about 660 mm or about 455 mm to about 810 mm), the gate frame 210 may be secured to the proximal hole pattern 852. For wider access areas 120 (e.g., at least 660 mm or at least 810 mm), the gate frame 210 may be secured to the distal hole pattern 854. Thus, the hinged safety gate 200 may have a width of at least 660 mm or 810 mm when the gate frame 210 is mounted to the distal hole pattern and of between about 380 mm or about 455 mm and about 660 mm or about 810 mm when the gate frame 210 is mounted to the proximal hole pattern. In some embodiments, the gate frame 210 can be adjusted between proximal and distal hole patterns via a horizontally elongated slot in the frame adjustment region 755 and/or the retainer adjustment region 751.

Referring again to FIGS. 8A-8C, adjusting the vertical position, e.g., the height, of the gate frame 210 may be accomplished by moving the fitted holes along the elongated holes 800 while maintaining sufficient overlap to receive a fastener through both. For example, a vertical position of the gate frame 210 relative to the retainer assembly 202 may be adjusted by way of moving the gate frame 210 between a lower adjusted position (shown in FIG. 8B) and an upper adjusted position (shown in FIG. 8C). To secure the gate frame 210 to the retainer plate 330, a received fastener can be tightened to an installation torque sufficient to maintain the position of the gate frame 210 relative to the retainer assembly 202 (or can be secured together without regard to fastener torque or friction). In some cases, the hinged safety gate 200 may be installed, and then the vertical position of the gate frame 210 may be adjusted to fine tune the position and fit of the hinged safety gate 200 (e.g., to comply with safety requirements).

Figure 9:
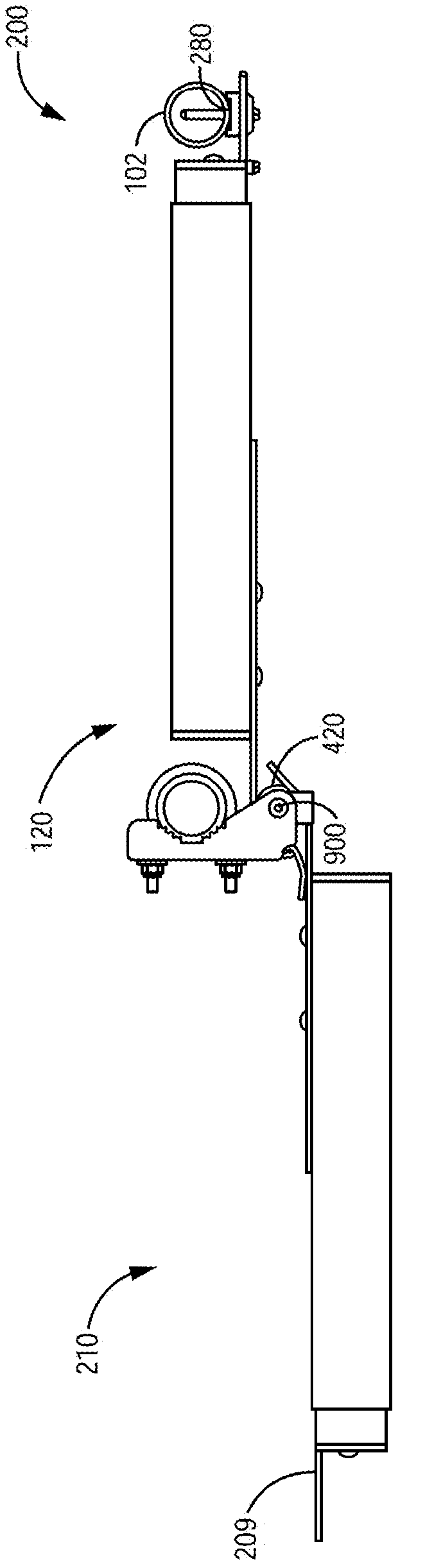
FIG. 9 is a top elevational view of a hinged safety gate swung from a closed position, indicated by the shadow, to an open position.

During use, the hinged safety gate 200 may have the gate frame 210 pivot about a pivot axis 900, e.g., the centerline axis through the windings of the spring assembly 420 as shown in FIG. 9. When in the open position, passage through the hinged safety gate 200 may be allowed and, when in the closed position, passage through the hinged safety gate 200 can be prevented. In most instances, the gate frame 210 pivots away from the access area 120 to swing to the open position and pivots toward the access area 120 to swing to the closed position. When in the closed position, the gate stop 209 of the gate frame 210 may rest against a stopping surface 280 (e.g., the second stanchion 102) to prevent motion of the gate frame 210 beyond a desired stopping point (e.g., a point such that the hinged safety gate 200 spans the access area 120). Installations with wider access areas 120 may include a support block (not shown), which can be placed at the stopping surface 280 just below the lowest point where the gate stop 209 mates with the stopping surface 280. Such placement of the support block may, e.g., prevent the gate frame 210 from sagging when in the closed position by providing support to the gate stop 209 in the vertical direction. In embodiments that employ a hinge stop configuration, the hinge stop may cause the gate frame 210 to return to the closed position and stop there. In some such embodiments, two hinged safety gates may be used in a paired arrangement with the gates' proximal ends being positioned opposite one another and the gates' distal ends being positioned next to one another. In any of these instances, the spring assembly 420 can bias swinging of the hinged safety gate 200 to be in a safe position after use.

For added safety, the spring assembly 420 can be biased to maintain the hinged safety gate 200 in the closed position. When in the closed position, the distal upright member may be positioned proximate to a stanchion (e.g., the second stanchion 102). In some such instances, swinging of the hinged safety gate 200 can be limited by the gate stop 209. For example, after the hinged safety gate 200 is swung into the open position, the spring assembly 420 may pivot the hinged safety gate 200 toward the closed position. Once in the closed position, the hinged safety gate 200 can be caught by the gate stop 209 mating with a stopping surface 280. In such circumstances, swinging of the hinged safety gate 200 past the stopping surface 280 is prevented, and the spring assembly 420 can maintain a closing force between the gate stop 209 and the stopping surface 280. In embodiments that employ a hinge stop configuration, the spring assembly 420 and the hinge stop may maintain a closing force. The closing force may be overcome by a user operating the hinged safety gate 200.

Referring to FIGS. 10A-10D, in many embodiments of the hinged safety gate, the upper cross-arm and/or the lower cross-arm may be made of multiple components that complement and connect to one another. For example, the upper cross-arm main portion can include a main tube 1010 (e.g., an upper main tube), and the upper cross-arm extension can include an extension tube 1020 (e.g., an upper extension tube). In some embodiments, the lower cross-arm main portion can include the main tube 1010 (e.g., a lower main tube), and the lower cross-arm extension can include the extension tube 1020 (e.g., a lower extension tube). In various embodiments, both the upper cross-arm main portion and the lower cross-arm main portion can include the upper main tube and the lower main tube respectively and the upper cross-arm extension and the lower cross-arm extension may include the upper extension tube and the lower extension tube. The extension tube 1020 may be telescopingly slideable within the main tube 1010. In some embodiments, the upper and/or lower cross-arm main portions (the components nearest the proximal upright member) may be telescopingly slideable within the upper and/or lower cross-arm extensions.

Figure 10A:
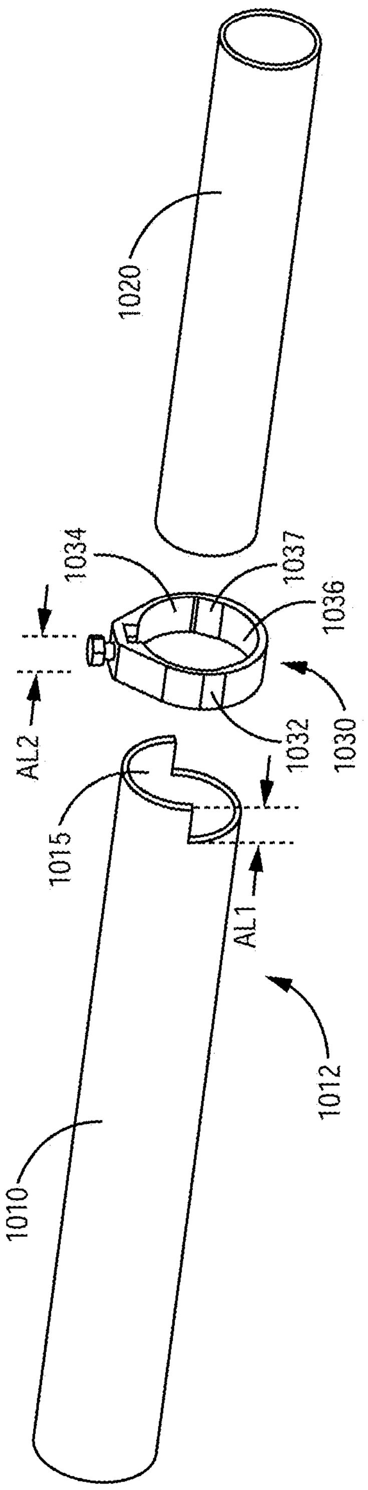
FIG. 10A is an exploded perspective view of a main tube, an extension tube, and a ring clamp.

To secure the main tube 1010 to the extension tube 1020, a ring clamp 1030, which may surround at least a portion of the main tube 1010 and the extension tube 1020, may be included. In some such embodiments, the main tube 1010 may include a tab 1015 that extends an axial length (shown as AL1 in FIGS. 10A and 10B), beyond a distal end 1012 of the main tube 1010 as shown in FIG. 10A. In some embodiments, the tab 1015 may include a partial tube. For example, the upper main tube may have a first tab with a first axial length, the lower main tube may have a second tab with a second axial length, or both. In some instances, the first axial length may be equal to the second axial length, and in other instances, the first axial length may be different than the second axial length.

Figure 10B:
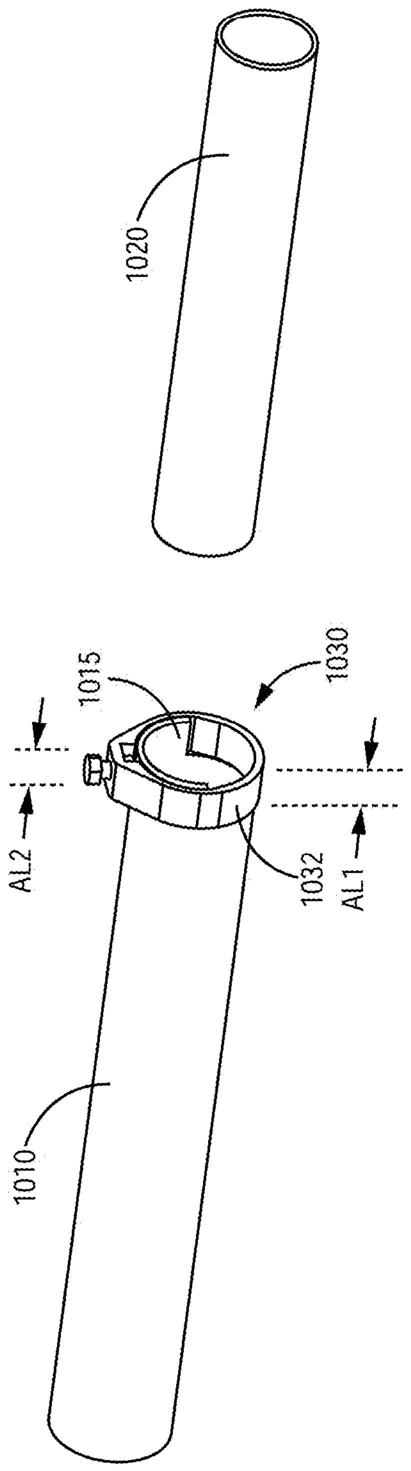
FIG. 10B is a perspective view of a main tube, an extension tube, and a ring clamp positioned over a tab of the main tube.

The ring clamp 1030 may be complementary to at least a portion of either or both of the upper cross-arm and the lower cross-arm and may be configured to hold the main tube 1010 and the extension tube 1020 securely together. As best seen in FIGS. 10A and 10B, the ring clamp 1030 can have a ring clamp body 1032 with an axial length (shown as AL2 in FIGS. 10A and 10B) roughly equal to the axial length (AL1) of the tab 1015. Referring to FIG. 10A, the ring clamp body 1032 can include an inner profile with a tab portion 1034 that complements the tab 1015 and an extension tube portion 1036 that complements the extension tube 1020. In some embodiments, a transition portion 1037 of the inner profile may taper between the tab portion 1034 with a first radius and the extension tube portion 1036 with a second radius that is smaller than the first radius. The transition portion 1037 may provide sufficient clearance between the main tube 1010 and the tab 1015 to allow for movement of the ring clamp body 1032.

Figure 10D:
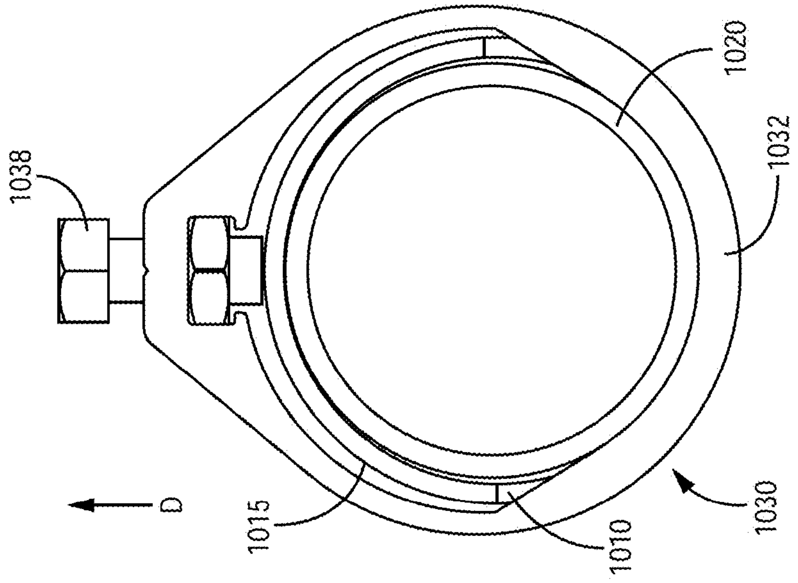
FIG. 10D is a side elevational view of a main tube, an extension tube, and a ring clamp positioned over a tab of the main tube and a portion of the extension tube with a fastener of the ring clamp tightened.
Figure 10C:
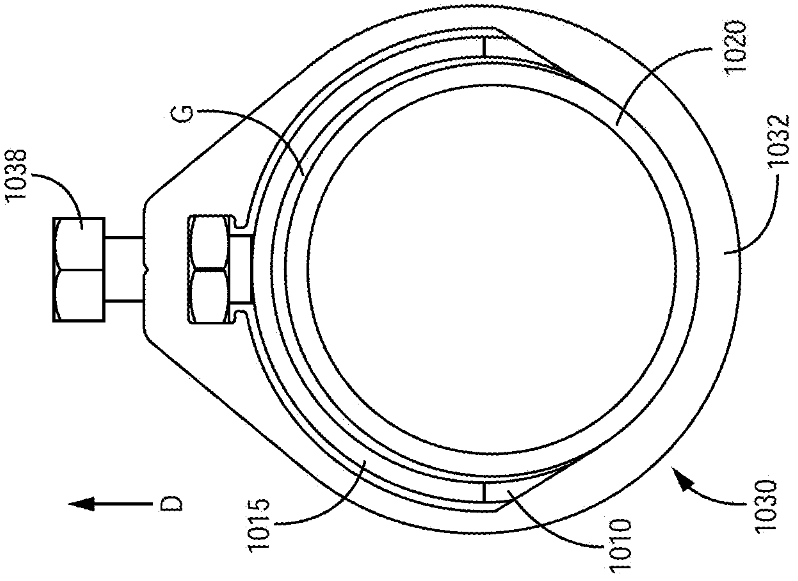
FIG. 10C is a side elevational view of a main tube, an extension tube, and a ring clamp positioned over a tab of the main tube and a portion of the extension tube with a fastener of the ring clamp untightened.

The ring clamp body 1032 may move between the positions shown in FIGS. 10C and 10D. For instance, the ring clamp 1030 may include a fastener 1038 configured to push the tab 1015 into firmer contact with the extension tube 1020. Tightening the fastener 1038 may pull the ring clamp body 1032 in the upward direction, D. As the fastener 1038 is tightened, the ring clamp body 1032 may progressively reduce a gap, G, in between the tab 1015 of the main tube 1010 and the extension tube 1020. Thus, tightening the fastener 1038 may thereby pull the extension tube 1020 into firmer contact with the tab 1015. For example, when the fastener 1038 is sufficiently tightened, the gap, G, may be reduced to zero. To lessen contact between the extension tube 1020 and the tab 1015, the fastener 1038 can be untightened (e.g., to move the clamp body in the opposite direction of the upward direction, D).

Though discussed and depicted in certain locations and in certain components, the upper ring clamp, the lower ring clamp, or both may vary along those lines without departing from the scope of the present disclosure. For instance, in some embodiments, the upper cross-arm may include the upper ring clamp and the lower cross-arm may not include the lower ring clamp. In some embodiments, the upper cross-arm may not include the upper ring clamp and the lower cross-arm may include the lower ring clamp. In some embodiments, both the upper cross-arm and the lower cross-arm may include the upper ring clamp and the lower ring clamp respectively. In some embodiments, neither the upper cross-arm nor the lower cross-arm may include a ring clamp. In embodiments in which the main tube fits within the extension tube, the extension tube may have a tab that extends proximally from its proximal end, and the ring clamp may interface with that tab and with the main tube.

Figure 11:
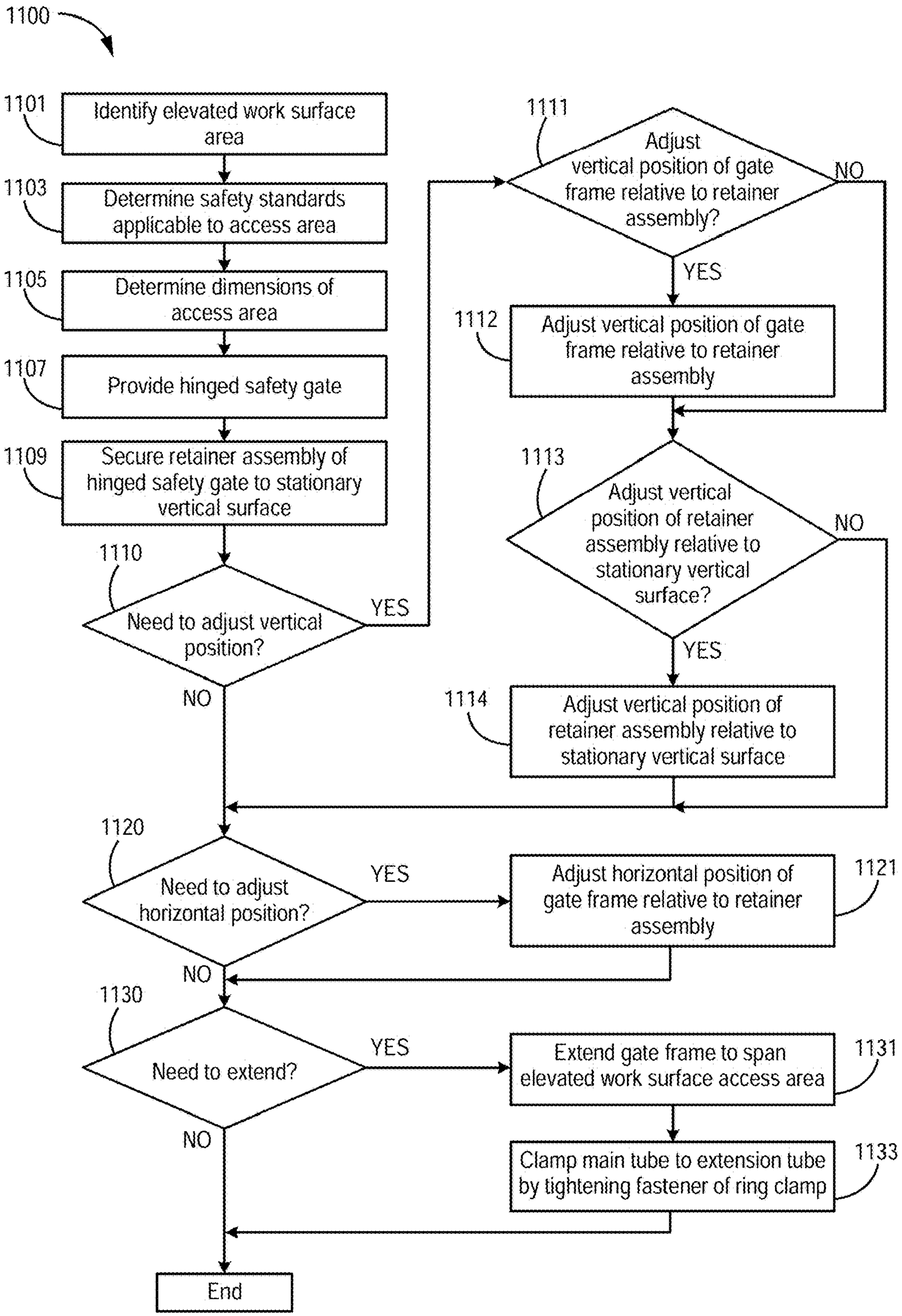
FIG. 11 is a flowchart of an illustrative method for controlling access through an elevated work surface access area.

FIG. 11 illustrates a method 1100 of installing a hinged safety gate as disclosed herein within an elevated work surface access area while satisfying safety requirements for the access area. In some embodiments, an installer may begin the process of installing the hinged safety gate into an elevated work surface access area by identifying an elevated work surface 1101. Once an access area is identified, the installer may determine which safety requirements apply to the access area 1103. To determine how to install the hinged safety gate to meet safety requirements, the installer may determine the dimensions of the access area 1105. For instance, the installer can measure the access area of the elevated work surface and compare the measurements from the access area to the dimensions in the relevant safety requirements and of the hinged safety gate. The method 1100 can include providing a hinged safety gate 1107 according to those dimensions.

Having identified the access area and determined applicable safety requirements and dimensions of the access area, the installer may provide a hinged safety gate to be installed within the access area 1107. For example, the hinged safety gate can have an upper cross-arm and a lower cross-arm that have a combined height to satisfy the spacing-between-cross-arms safety requirement. To install the hinged safety gate, the installer may secure the retainer assembly of the hinged safety gate to the first stationary vertical surface 1109 as described elsewhere herein. In some embodiments, the position of the hinged safety gate may need to be adjusted before or after securing the retainer assembly to the stationary surface.

As part of installation, the hinged safety gate may require adjustments to the vertical position of the hinged safety gate to meet safety requirements. For example, the installer may determine whether the vertical position of the hinged safety gate needs to be adjusted 1110. The vertical position of the gate frame may be adjusted by adjusting either or both of the gate frame and the retainer assembly. If the installer determines that the vertical position of the gate frame does not need to be adjusted (or after vertical adjustments have been completed), the installer may proceed to check whether other positional adjustments are necessary to satisfy safety requirements. Adjusting the vertical position of the hinged safety gate may enable the hinged safety gate to satisfy the platform-to-lower-edge safety requirement and/or the overall height safety requirement as described in greater detail elsewhere herein.

In many embodiments, vertical position adjustments can include adjusting the position of the gate frame. For instance, the installer may determine if the vertical position of the gate frame relative to the first stationary vertical surface needs to be adjusted 1111. If the installer determines that the vertical position of the gate frame needs to be adjusted, the installer may proceed by adjusting the vertical position of the gate frame relative to the retainer assembly 1112. Such adjustments can include adjusting the frame adjustment region relative to the retainer adjustment region. For example, the installer can move the fitted holes along the elongated holes while maintaining sufficient overlap to receive a fastener through both and securing the gate frame to the retainer plate in an adjusted position. If the installer determines that the vertical position of the retainer assembly does not need to be adjusted (or after vertical adjustments to the gate frame have been completed), the installer may proceed to check whether other positional adjustments are necessary to satisfy safety requirements.

Some vertical position adjustments can include adjusting the position of the retainer assembly. The installer may determine if the vertical position of the retainer assembly relative to the first stationary vertical surface needs to be adjusted 1113. If the installer determines that the vertical position of the retainer assembly needs to be adjusted, the installer may proceed by adjusting the vertical position of the retainer assembly relative to the stationary surface 1114. If the installer determines that the vertical position of the retainer assembly does not need to be adjusted (or after vertical adjustments to the retainer assembly have been completed), the installer may proceed to check whether other positional adjustments are necessary to satisfy safety requirements. For example, during initial installations, the installation position may be determined such that after the retainer assembly is secured to the first stationary vertical surface, no adjustments to the retainer assembly are needed. In another example, if the hinged safety gate does not satisfy safety requirements when the gate frame is at its uppermost or lowermost adjusted position (e.g., due to an error in measurement), adjusting the vertical position of the retainer assembly may enable the hinged safety gate to still satisfy safety requirements. Some such instances may include reinstallation of the hinged safety gate where an existing guard-rail is replaced with a new, taller or shorter guard-rail. To secure the retainer assembly to the first stationary vertical surface 1109 in such instances, the previous fastener assembly (e.g., U bolts) may be loosened or removed to allow vertical position adjustments of the retainer assembly relative to the first stationary vertical surface and then reinstalled.

As part of installation, the hinged safety gate may require adjustments to the horizontal position of the hinged safety gate. For example, the installer may determine whether the horizontal position of the hinged safety gate needs to be adjusted 1120. If the installer determines that the horizontal position of the gate frame needs to be adjusted, the installer may adjust the horizontal position of the gate frame relative to the retainer assembly. If the installer determines that the horizontal position of the hinged safety gate does not need to be adjusted (or after horizontal adjustments have been completed), the installer may continue by checking if moving portions of the hinged safety gate is needed to satisfy safety requirements.

In many embodiments, adjusting the horizontal position of the hinged safety gate can include adjusting the position of the gate frame. In some instances, adjusting the horizontal position of the gate frame relative to the retainer assembly 1121 can include mounting the gate frame to either a proximal hole pattern or a distal hole pattern of the retainer plate (e.g., positions along horizontally elongated slots) as described elsewhere herein. For example, a standard access area may require the gate frame to be mounted to the proximal hole pattern while a wider access area may require the gate frame to be mounted to the distal hole pattern. Some installations of the hinged safety gate may require extending the gate frame as a substitute for or beyond the steps of mounting the gate frame to the proximal hole pattern or the distal hole pattern.

Some installations of the hinged safety gate may include extending the hinged safety gate. For example, the installer may determine whether the hinged safety gate needs to be extended 1130. Such instances may include where distances are greater or less than the distance between the proximal and distal hole pattern. If the installer determines that the hinged safety gate needs to be extended, the installer may extend the gate frame to span the elevated work surface access area 1131. To fasten an extended gate frame where the hinged safety gate includes a main tube and an extension tube, the method 1100 can include clamping the main tube to the extension tube by tightening the fastener of a ring clamp 1133 as described elsewhere herein. If the installer determines that the hinged safety gate does not need to be extended (or after extension of the hinged safety gate has been completed), the installer may end the installation with the hinged safety gate installed while satisfying safety requirements for the access area.

Once installed as described above, the hinged safety gate in the access area can satisfy a number of safety requirements. For instance, the vertical position of the installed hinged safety gate can be such that the height between the lower edge of the hinged safety gate and the platform satisfies the platform-to-lower-edge safety requirement (e.g., about 500 mm or less) and that the height between an upper edge of the upper cross-arm and the platform satisfies the overall-height requirement (e.g., about 1100 mm or more). The cross-arms in the installed hinged safety gate may satisfy the spacing-between-cross-arms safety requirement. Either or both of adjusting the horizontal position of the gate frame relative to the retainer assembly 1121 and extending the gate frame to span the access area 1131 can enable the hinged safety gate to fit within access areas that satisfy the access-area-width requirement. A hinged safety gate installed as described above can allow for safe passage into and out of the elevated work surface through the access area.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A hinged safety gate comprising:

a gate frame configured to control access to an elevated work surface access area, the gate frame having a frame adjustment region, a distal upright member, an upper cross-arm, and a lower cross-arm, the upper cross-arm including an upper main tube and an upper extension tube, the upper main tube comprising a first tab that extends a first axial length beyond a distal end of the upper main tube and that comprises a first partial tube, the lower cross-arm including a lower cross-arm main portion and a lower cross-arm extension; and a retainer assembly configured to be attached to a proximal end of the gate frame and configured to hingedly couple the gate frame to a first stationary vertical surface to permit the gate frame to swing between an open position and a closed position in which the distal upright member is positioned proximate to a second stationary vertical surface, the second stationary vertical surface opposing the first stationary vertical surface;

wherein the gate frame is movable between an extended position and an unextended position, with the upper extension tube being telescopingly slidable within the upper main tube and the lower cross-arm extension being movable relative to the lower cross-arm main portion; and wherein the upper cross-arm further includes an upper ring clamp configured to hold the upper main tube and the upper extension tube together, the upper ring clamp having an upper ring clamp body with an axial length approximately equal to the first axial length, the upper ring clamp body comprising a first inner profile with a first tab portion that matches and mates with the first tab and with an upper extension tube portion that matches and mates with the upper extension tube, the upper ring clamp further comprising a first fastener configured to push the first tab into clamping contact with the upper extension tube and to pull the upper ring clamp body toward the upper extension tube, thereby pulling the upper extension tube into clamping contact with the first tab.

2. The hinged safety gate of claim 1, wherein the retainer assembly further comprises a retainer plate with a retainer adjustment region that includes multiple sets of mounting holes that are horizontally offset from one another, each said set of mounting holes including an upper mounting hole and a lower mounting hole;

wherein a horizontal position of the gate frame relative to the retainer assembly is adjustable based on which one of said sets of mounting holes is used to mount the retainer plate to the gate frame, wherein the frame adjustment region and the retainer adjustment region further facilitate adjustment of a vertical position of the gate frame relative to the retainer assembly.

3. The hinged safety gate of claim 2, wherein each said set of mounting holes further includes a middle mounting hole positioned vertically between the upper mounting hole and the lower mounting hole.

4. The hinged safety gate of claim 3, wherein, for each said set of mounting holes, the upper mounting hole is vertically aligned with the lower mounting hole and, the middle mounting hole is horizontally offset from the upper mounting hole and the lower mounting hole.

5. The hinged safety gate of claim 3, wherein, for each said set of mounting holes, the middle mounting hole is positioned vertically midway between the upper mounting hole and the lower mounting hole.

6. The hinged safety gate of claim 2, wherein one of the frame adjustment region and the multiple sets of mounting holes of the retainer adjustment region comprises fitted mounting holes and the other of the frame adjustment region and the multiple sets of mounting holes comprises elongated mounting holes.

7. The hinged safety gate of claim 2, wherein the multiple sets of mounting holes comprise multiple sets of fitted mounting holes.

8. The hinged safety gate of claim 2, wherein the retainer assembly includes a spring assembly and a hinged bracket, the spring assembly being coupled between the retainer plate and the hinged bracket, and wherein the spring assembly is configured to bias the gate frame toward the closed position.

9. The hinged safety gate of claim 8, wherein the spring assembly includes an annular cylindrical bushing configured to support a spring in the spring assembly.

10. The hinged safety gate of claim 2, wherein the multiple sets of mounting holes comprise exactly two sets of mounting holes.

11. The hinged safety gate of claim 1, wherein the gate frame further has a proximal upright member, and the retainer assembly is configured to be attached to the proximal upright member of the gate frame.

12. The hinged safety gate of claim 1, wherein:

the lower cross-arm main portion comprises a lower main tube, the lower cross-arm extension comprises a lower extension tube, and the lower extension tube is telescopingly slideable within the lower main tube.

13. The hinged safety gate of claim 12, wherein:

the lower main tube comprises a second tab that extends a second axial length beyond a distal end of the lower main tube and that comprises a second partial tube, and the lower cross-arm further includes a lower ring clamp configured to hold the lower main tube and the lower extension tube together, the lower ring clamp having a lower ring clamp body with an axial length approximately equal to the second axial length, the lower ring clamp body comprising a second inner profile with a second tab portion that matches and mates with the second tab and with a lower extension tube portion that matches and mates with the lower extension tube, the lower ring clamp further comprising a second fastener configured to push the second tab into clamping contact with the lower extension tube and to pull the lower ring clamp body toward the lower extension tube, thereby pulling the lower extension tube into clamping contact with the second tab.

14. A hinged safety gate comprising:

a gate frame configured to control access to an elevated work surface access area, the gate frame having a frame adjustment region, a distal upright member, an upper cross-arm, and a lower cross-arm, the upper cross-arm including an upper main tube and an upper extension tube, the lower cross-arm including a lower main tube and a lower extension tube, wherein the upper main tube comprises a first tab that extends an axial length beyond a distal end of the upper main tube and that comprises a partial tube, wherein the upper cross-arm further includes an upper ring clamp configured to hold the upper main tube and the upper extension tube together, the upper ring clamp having an upper ring clamp body with an axial length approximately equal to the axial length of the tab, the upper ring clamp body comprising an inner profile with a tab portion that matches and mates with the tab and with an upper extension tube portion that matches and mates with the upper extension tube, the upper ring clamp further comprising a fastener configured to push the tab into clamping contact with the upper extension tube and to pull the upper ring clamp body toward the upper extension tube, thereby pulling the upper extension tube into clamping contact with the tab; and a retainer assembly configured to be attached to a proximal end of the gate frame and configured to hingedly couple the gate frame to a stationary vertical surface to permit the gate frame to swing between an open position and a closed position in which the distal upright member is positioned proximate to a second stationary vertical surface, the second stationary vertical surface opposing the first stationary vertical surface;

wherein, when the upper extension tube is not in clamping contact with the first tab, the gate frame is movable between an extended position and an unextended position with the upper extension tube being telescopingly slideable within the upper main tube and the lower extension tube being telescopingly slideable within the lower main tube.

15. The hinged safety gate of claim 14, wherein the retainer assembly includes a retainer plate with a retainer adjustment region, and wherein the frame adjustment region and the retainer adjustment region facilitate adjustment of a horizontal position of the gate frame relative to the retainer plate.

16. The hinged safety gate of claim 15, wherein the retainer adjustment region and the frame adjustment region include a combination of elongated holes and fitted holes.

17. The hinged safety gate of claim 15, wherein the frame adjustment region and the retainer adjustment region further facilitate adjustment of a vertical position of the gate frame relative to the retainer plate.

18. The hinged safety gate of claim 15, wherein the retainer adjustment region includes multiple sets of mounting holes that are horizontally offset from one another, with each one of said sets of mounting holes including an upper mounting hole and a lower mounting hole.

19. The hinged safety gate of claim 18, wherein the upper mounting hole and the lower mounting hole of each one of said sets of mounting holes each comprise a fitted mounting hole.

20. The hinged safety gate of claim 19, wherein the frame adjustment region includes a set of elongated mounting holes that facilitate further adjustment of a vertical position of the gate frame relative to the retainer plate.

21. The hinged safety gate of claim 20, wherein each mounting hole of the set of elongated mounting holes are elongated in a vertical direction and.

22. The hinged safety gate of claim 14, wherein the gate frame further has a proximal upright member, and the retainer assembly is configured to be attached to the proximal upright member of the gate frame.

23. The hinged safety gate of claim 14, wherein the retainer assembly includes a spring assembly and a hinged bracket, the spring assembly being configured to bias the gate frame toward the closed position.

24. The hinged safety gate of claim 23, wherein the spring assembly includes an annular cylindrical bushing configured to support of a spring in the spring assembly.

25. The hinged safety gate of claim 14, wherein the tab portion has a first radius, and the upper extension tube portion has a second radius that is smaller than the first radius, wherein the inner profile further includes transition portions that taper between the tab portion and the upper extension tube portion.

26. A hinged safety gate comprising:

a gate frame configured to control access to an elevated work surface access area, the gate frame having a frame adjustment region, a distal upright member, an upper cross-arm, and a lower cross-arm, the upper cross-arm including an upper main tube and an upper extension tube, the lower cross-arm including a lower main tube and a lower extension tube, wherein the lower main tube comprises a tab that extends an axial length beyond a distal end of the lower main tube and that comprises a partial tube, wherein the lower cross-arm further includes a lower ring clamp configured to hold the lower main tube and the lower extension tube together, the lower ring clamp having a lower ring clamp body with an axial length approximately equal to the axial length of the tab the lower ring clamp body comprising an inner profile with a tab portion that matches and mates with the tab and with a lower extension tube portion that matches and mates with the lower extension tube, the lower ring clamp further comprising a fastener configured to push the tab into clamping contact with the lower extension tube and to pull the lower ring clamp body toward the lower extension tube, thereby pulling the lower extension tube into clamping contact with the tab; and a retainer assembly configured to be attached to a proximal end of the gate frame and configured to hingedly couple the gate frame to a first stationary vertical surface to permit the gate frame to swing between an open position and a closed position in which the distal upright member is positioned proximate to a second stationary vertical surface, the second stationary vertical surface opposing the first stationary vertical surface;

wherein, when the lower extension tube is not in clamping contact with the tab, the gate frame is movable between an extended position and an unextended position with the lower extension tube being telescopingly slideable within the lower main tube and the upper extension tube being telescopingly slideable within the upper main tube.

* * * * *